Oct. 3, 1944.  A. J. DEXTER ET AL  2,359,629
RIVET
Filed Jan. 6, 1943
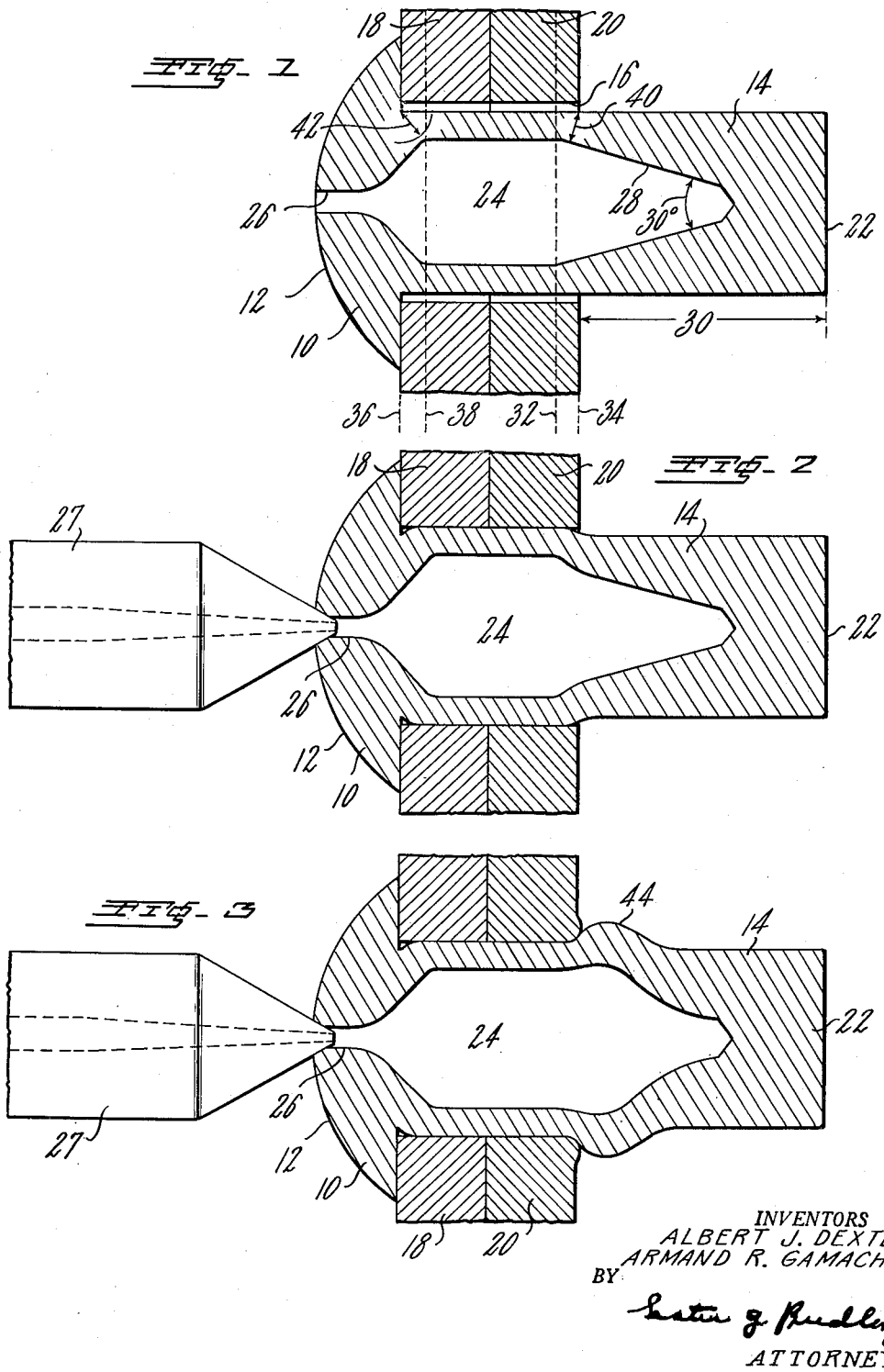
INVENTORS
ALBERT J. DEXTER
ARMAND R. GAMACHE
BY
*Lester J. Pudley*
ATTORNEY Patented Oct. 3, 1944

2,359,629

UNITED STATES PATENT OFFICE 2,359,629

RIVET

Albert J. Dexter and Armand R. Gamache, Springfield, Mass., assignors to United States Rubber Company, New York, N. Y., a corporation of New Jersey Application January 6, 1943, Serial No. 471,394

5 Claims. (Cl. 85—40)

This invention relates to hollow rivets which are set or expanded by the pressure of liquid forced into the rivet by a pressure-applying tool.

It has been proposed by others to provide hollow rivets containing an hydraulic pressure chamber within the shank and communicating with the exterior of the rivet through a constricted passage. Liquid forced into the chamber through the passage by a suitable pressure-applying tool stretches the wall of the chamber to expand the shank of the rivet to form a more or less globular head. The passage which communicates with the chamber has a relatively small cross sectional area with reference to the chamber itself so that a relatively large stretching force can be applied to the wall of the chamber by a relatively high pressure, while the thrust or force by which the pressure applying tool is held against the head of the rivet may be relatively small and yet maintain a seal between the tool and the rivet.

While the rivets described are satisfactory in many instance, it has been our experience that with certain kinds and sizes of rivet, and with certain materials it is difficult or impossible to secure, with adequate regularity, uniform expansion of the shank to the extent necessary to provide a secure joint, and it is difficult to avoid rupture of the rivet before the desired degree of expansion is attained. As a practical matter in the case of thin sheets of aluminum and magnesium alloys such as are currently used in airplane manufacture, it is necessary to expand the shank to a diameter which is at least 115% of the diameter of the rivet hole in order to provide a satisfactory joint. Certain rivets tend to expand wholly on one side or in a localized area, and this may rupture before the shank has expanded throughout its entire circumference to the desired extent. On the other hand, even if the shank does not rupture, the rivet may be uneven or crooked and the joint weak. Also in the case of previously known rivets, it has been found that the portion of the shank in the rivet hole frequently does not expand enough to fill the hole tightly. This leaves the riveted joint undesirably loose.

We do not fully understand why these undesirable results occur, but we have discovered that in rivets embodying our invention, these disadvantages are largely reduced or eliminated. It is therefore among the objects of the invention to provide an improved hydraulically expanded rivet in which expansion of the shank to fill the hole is assured, and to provide a rivet which expands more nearly uniformly outside of the rivet hole to form a strong symmetrical head, free of rupture. It is also an object to provide a rivet which exerts a greater axial compressive force on the plates or objects to be riveted than previously known hydraulic rivets and thus provides a tighter joint. This is important in the construction of fluid-tight containers.

In the drawing:

Fig. 1 is a longitudinal section showing a joint and rivet embodying my invention before the rivet has been expanded or set.

Fig. 2 is a corresponding sectional view of the rivet after the first stage of the setting operation, and Fig. 3 is a similar sectional view of the completely set or expanded rivet.

As shown in the drawing, the rivet consists of an integral body of material including a head 10 having a face 12, and a hollow shank 14 which is adapted to be inserted in aligned rivet holes 16 in plates 18 and 20 to be joined. In the drawing the clearance between the shank and the holes is exaggerated for clarity in illustration. The hollow shank has a closed end 22 and encloses a pressure chamber 24 which communicates with the exterior of the rivet through a constricted passage 26 leading to the face of the rivet. Any suitable pressure-applying tool 27 may be held against the face of the head of the rivet and in communication with the passage to supply liquid under pressure to the interior of the rivet. The cross sectional area of the passage at the point where the tool is applied is quite small, materially smaller than the cross sectional area of the main portion of the chamber. As so far described the rivet has been proposed by others and is not our invention.

In accordance with our invention the end 28 of the chamber 24 which is opposite the passage 26 has a progressively diminishing cross sectional area as it approaches the closed end of the shank. The cross section may be diminished step by step, but preferably this portion of the chamber is tapered. We have found that about 30° is a critical value for the angle of the sides of the taper, which yields markedly superior results, although some of the advantages of the invention may be secured with other angles of the taper.

The location of the taper is also important. The projecting length 30 of the shank should be about one and one-third times the diameter of the shank. Also the plane 32 where the conical or tapered portion 28 joins the cylindrical body of the chamber should lie adjacent the outside plane 34 of the layer 20. We have discovered that there is a critical location for the plane 32 which gives marked advantages. The plane 32 should lie between the outside planes 34 and 36 of the plates being joined, and it should be closely adjacent the plane 34. However it should not be closer to the plane 34 than about .015 inch, regardless of the size of the rivet or thickness of plates being joined. The advantages of the invention will be obtained to some extent if the planes 32 and 34 are separated by more than .015 inch, but they should not be closer than approximately this amount.

With the factors proportioned as indicated above there will be sufficient material at the closed end of the shank beyond the cylindrical part of the chamber to provide sufficient strength. Moreover, as a practical production matter, the end of the taper will be blunt or cut off, as indicated in the drawing, so that the material remaining in the end of the shank will ordinarily be more than adequate.

The untapered portion of the chamber will ordinarily be of uniform cross-sectional area and will be cylindrical. This cylinder extends to a plane 38 adjacent the head of the rivet, and it should be as close to the head as is possible. The ideal theoretical location is at the face 36 of the plate 18 but it must be moved inward to permit the minimum thickness of the shell near the head to be greater than the thickness of the wall of the chamber at the plane 34, otherwise we have found that the rivet will rupture adjacent the head before the shank expands sufficiently to make an adequately tight joint.

In Fig. 1 the thickness arrows 40 and 42 are equal. The arrow 40 designates the minimum thickness of the wall of the chamber normal to the surface of the taper 28, and at the location where the plane 34 intersects the shank of the rivet. It will be seen that the minimum thickness of the wall at the location where the plane 36 intersects the shank of the rivet is materially greater than the length of the arrow 42.

Fig. 2 shows how the rivet expands when pressure is first applied. Preferably the tool 27 is constructed in any suitable manner to deliver into the chamber of the rivet a predetermined quantity of liquid, such as oil, or a self-hardening liquid such as lacquer or a thermo-plastic composition. This may be delivered at pressures of the order of 8.000 to 12,000 pounds per square inch or more. The force tending to stretch the walls of the chamber will cause the thin cylindrical wall to expand before the thicker tapered wall as the resistance to stretching at any given point is proportional to the thickness of the wall at that point. Thus the part of the chamber to the right of the intermediate plane 32 in Fig. 2 has a progressively increasing resistance to stretching, as the closed end 22 is approached. The cylindrical portion of the chamber between planes 38 and 32 has the greatest stretching force applied to it, and has the least resistance to stretching. Therefore this portion will expand before the tapered portion 28 expands appreciably. Thus the portion of the rivet between planes 34 and 36 expands to fill up the hole completely before the projecting portion of the shank expands. We believe this centers the rivet accurately in the hole and that this is an important aid in preventing subsequent uneven expansion of the projecting portion of the shank.

After the shank has expanded as shown in Fig. 2, increased pressure of the liquid in the tool 27 progressively expands the projecting portion of the shank from the plane 34 outward toward the closed end 22. This expands progressively because with increasing distances from the plane 34, the stretching force is decreased, for a given pressure, by the diminishing area of the cross section of the chamber, and the resistance to stretching increases due to the increasing thickness of the wall.

When the prescribed quantity of liquid has been forced into the chamber, the rivet has expanded to form a bulbous head 44 as shown in Fig. 3. The corner of the plate 20 at the hole 16 has been distorted slightly, as shown, and the head 44 presses tightly in the axial direction against the plate 20 around the hole.

We do not know whether the improved results secured with rivets embodying the invention are due to the tapered shape of the chamber or the progressively increased thickness of the wall of the chamber, or both, but we have observed that rivets embodying the invention draw the plates together perpendicular to their surfaces more tightly than previously known hydraulic rivets and the radial expansion of the shank fills the holes and holds the plates more firmly against movement parallel to their surfaces. The result is a tighter and more secure joint than is obtainable with hydraulic rivets as previously constructed.

Having thus described our invention, what we claim and desire to protect by Letters Patent is:

1. In a rivet an integral body of a material adapted to develop a permanent set and including a head and shank, the shank being formed with a closed end remote from the head and an hydraulic pressure chamber extending axially within the shank and having an opening communicating with the chamber through the head for the introduction of fluid into said chamber under hydraulic pressure, the chamber being provided near said remote end with a long tapered bore that progressively diminishes in cross section toward said end, whereby when said chamber is subjected to hydraulic pressure the walls of the main portion thereof disposed between the head and said tapered bore will expand first and then the thicker walls of the tapered bore portion will expand under increased hydraulic pressure to form a bulbous head.

2. In a rivet an integral body of a material adapted to develop a permanent set and including a head and shank, the shank being formed with a closed end remote from the head and an hydraulic pressure chamber extending axially within the shank and having an opening communicating with the chamber through the head for the introduction of fluid into said chamber under hydraulic pressure, the chamber being provided near said remote end with a converging bore that tapers at about 30° towards the closed end of the rivet, whereby when said chamber is subjected to hydraulic pressure the walls of the main portion thereof disposed between the head and said tapered bore will expand first and then the thicker walls of the tapered bore portion will expand under increased hydraulic pressure to form a bulbous head.

3. In a rivet an integral body of a material adapted to develop a permanent set and including a head and shank, the shank being formed with a closed end remote from the head and an hydraulic pressure chamber extending axially within the shank and having an opening of greatly reduced cross sectional area communicating with the chamber through the head for the introduction of fluid into said chamber under hydraulic pressure, the chamber being provided near said remote end with a long tapered bore that progressively diminishes in cross section toward said end, whereby when said chamber is subjected to hydraulic pressure the walls of the main portion thereof disposed between the head and said tapered bore will expand first and then the thicker walls of the tapered bore portion will expand under increased hydraulic pressure to form a bulbous head.

4. In a rivet adapted to secure together two or more plates having approximately aligned holes to receive the rivet, an integral rivet-forming body of a material adapted to develop a permanent set and including a head and shank, the shank being formed with a closed end remote from the head and an hydraulic pressure chamber extending axially within the shank and having an opening communicating with the chamber through the head for the introduction of fluid into said chamber under hydraulic pressure, the chamber being provided near said remote end with a long tapered bore that starts to taper just short of where the rivet projects from the outer plate and progressively diminishes in cross section toward said end, whereby when said chamber is subjected to hydraulic pressure the rivet walls will expand first in said holes and then the thicker walls of said tapered bore portion will expand to form a bulbous head that presses hard against an outer plate.

5. In a rivet adapted to secure together two or more plates having approximately aligned holes to receive the rivet, an integral rivet-forming body of a material adapted to develop a permanent set and including a head and shank, the shank being formed with a closed end remote from the head and an hydraulic pressure chamber extending axially within the shank and having an opening of greatly reduced cross sectional area communicating with the chamber through the head, the chamber being provided near said remote end with a long tapered bore that starts to taper just short of where the rivet projects from the outer plate and progressively diminishes in cross section toward said end, whereby when said chamber is subjected to hydraulic pressure it will expand first in said holes and then said tapered bore portion will expand to form a bulbous head that presses hard against an outer plate.

ALBERT J. DEXTER.
ARMAND R. GAMACHE.